United States Patent

Mihara et al.

[11] Patent Number: 5,882,154
[45] Date of Patent: Mar. 16, 1999

[54] GEAR FINISHING APPARATUS WITH A HELIX COMPENSATION

[75] Inventors: Toshihide Mihara, Amagasaki; Ryoji Yoshida, Suita, both of Japan

[73] Assignee: Kanzaki Kokyukoki Mfg. Co., Ltd., Japan

[21] Appl. No.: 894,613
[22] PCT Filed: Feb. 28, 1995
[86] PCT No.: PCT/JP95/00313
§ 371 Date: Aug. 22, 1997
§ 102(e) Date: Aug. 22, 1997
[87] PCT Pub. No.: WO96/26804
PCT Pub. Date: Sep. 6, 1996
[51] Int. Cl.⁶ ................................................ B23F 19/00
[52] U.S. Cl. .................... 409/9; 409/37; 409/49
[58] Field of Search ...................... 409/4, 8, 9, 37, 409/49

[56] References Cited

U.S. PATENT DOCUMENTS

| | | | |
|---|---|---|---|
| 2,916,971 | 12/1959 | McNabb et al. | 409/8 |
| 3,130,642 | 4/1964 | Kulesh et al. | 409/8 |
| 3,818,795 | 6/1974 | Upham | 409/9 |
| 4,084,481 | 4/1978 | Bossi | 409/37 |
| 4,265,575 | 5/1981 | Erhardt et al. | 409/8 |
| 4,477,214 | 10/1984 | Spensberger | 409/49 |
| 4,717,293 | 1/1988 | Spensberger et al. | 409/9 |
| 5,443,338 | 8/1995 | Huber et al. | 409/37 |

FOREIGN PATENT DOCUMENTS

| | | | |
|---|---|---|---|
| 3636058 | 4/1987 | Germany | 409/37 |
| 6-396325 | 2/1994 | Japan . | |
| 6-254719 | 9/1994 | Japan . | |
| 7-60542 | 3/1995 | Japan . | |

*Primary Examiner*—Andrea L. Pitts
*Assistant Examiner*—Christopher Kirkman
*Attorney, Agent, or Firm*—Larson & Taylor

[57] ABSTRACT

A gear finishing apparatus with helix compensation is disclosed, in which a helical gear is supported and rotated on a table by a gear holder and a tail stock, a finishing wheel is supported and rotated on a slider that can move toward and away from the finishing wheel in a substantially perpendicular direction to the gear axis, and the table and the slider are structured to relatively reciprocally move in the gear axis, wherein the gear holder comprises a drive motor for rotating a holder shaft for holding the helical gear; and a compensation drive unit by which a motor drum holding the drive motor is rotated about the gear axis, thereby compensating the circumferential speed in accordance with the helix angle of the helical gear during the relative movement of the helical gear and the finishing wheel in an axial direction of the gear and realizing high accuracy in the tooth profile of a helical gear.

3 Claims, 6 Drawing Sheets

GEAR FINISHING APPARATUS WITH A HELIX COMPENSATION

[FIELD OF THE INVENTION]

The present invention relates to a gear finishing apparatus for finishing a helical gear by rotating an internally toothed finishing wheel with which the helical gear meshes.

[PRIOR ART]

When high accuracy is required in the tooth profile of a gear, a finishing process, i.e., a so-called horning process is conducted to correct the deformation of the gear caused by a heat-treatment or the like. The finishing process is performed by meshing a finishing wheel with a workpiece gear at a predetermined crossed axes angle and then rotating the workpiece gear to modify its tooth profile. The finishing wheel is of a gear shape (generally, an internally toothed gear) and rotated by a drive unit. The finishing wheel moves in a direction perpendicular to the axis of the workpiece gear to cut in the workpiece gear. To perform a finishing process more uniformly, the workpiece gear is also moved repeatedly in an axial direction of the workpiece gear at the cutting depth. When the workpiece gear is a spur gear, the workpiece gear has only to reciprocally move in an axial direction while rotating at the same rotational speed as that of the finishing wheel, since the tooth surface of the workpiece gear is in parallel to its direction of movement. However, when the workpiece gear is a helical gear, the tooth surface thereof is inclined relative to its direction of movement. Therefore, the rotational speed of the finishing wheel needs to be modified according to the helix angle of the helical gear in order to reciprocally move the workpiece gear substantially in a direction along the inclined tooth surface of the helical gear.

When rotatably attaching a helical gear on a tail stock and driving the helical gear according to the rotation of the finishing wheel, the helical gear is guided by the tooth surface of the finishing wheel and has its rotation adjusted automatically by its helix angle in accordance with the reciprocal movement of the workpiece gear in its axial direction. However, to perform a more accurate finishing process, it is more desirable to drive the workpiece gear at the same circumferential speed as that of the finishing wheel rather than to drive the workpiece gear by the finishing wheel. When finishing a spur gear, the workpiece gear has only to be driven at the same circumferential speed as that of the finishing wheel, since the direction of movement of the workpiece gear is in parallel to the tooth surface of the finishing plane as afore-mentioned. Actually, there has been a finishing machine that performs such an operation. However, as for helical gears, there has been no such machine that drives a workpiece gear to accord with the rotation of a finishing wheel. Therefore, the industry has been seeking such a machine.

[PROBLEMS TO BE SOLVED BY THE INVENTION]

It is an object of the present invention to address these demands, i.e., to provide a gear finishing apparatus that can perform a finishing process while driving a helical gear according to a finishing wheel.

[MEANS FOR SOLVING THE PROBLEMS]

The object of the present invention is achieved by a gear finishing apparatus for finishing a helical gear by rotating a gear-type finishing wheel to thereby rotate the helical gear about its gear axis in mesh with the finishing wheel, the apparatus comprising:

a base;

a table supported on the base;

a gear holder supported on the table to hold the helical gear and rotate the helical gear about its gear axis;

a tail stock supported by the table on the opposite side of the helical gear to the gear holder to hold the helical gear;

a slider supported on the base so as to move toward and away from the helical gear in a substantially perpendicular direction to the gear axis of the helical gear;

a finishing wheel holder supported by the slider and holding the finishing wheel at a crossed axes angle relative to the helical gear and rotatably about the central axis of the helical gear;

a finishing wheel drive unit for rotating the finishing wheel on the finishing wheel holder; and a feeder for moving at least one of the table and the slider for relative movement between them in the direction along the gear axis, wherein the gear holder comprises
a holder body supported on the table;
a holder shaft mounted on the holder body rotatably about the gear axis to hold the helical gear;
a drive motor for rotating the holder shaft;
a motor drum for holding the motor rotatably about the gear axis relative to the holder body; and
a compensation drive unit for rotating the drum.

[EMBODIMENT]

Figure 1:
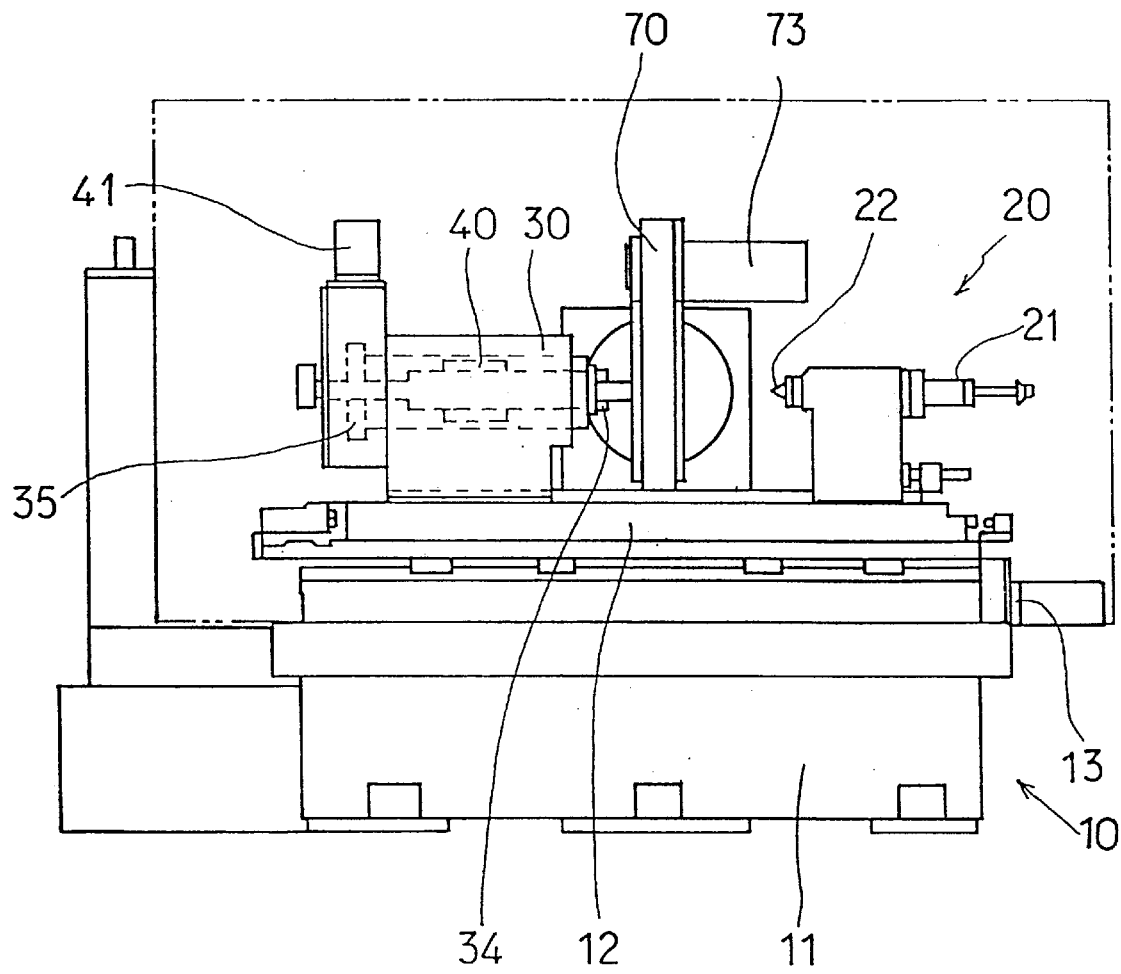
FIG. 1 is a front elevation of one embodiment of a gear finishing apparatus according to the present invention.
Figure 2:
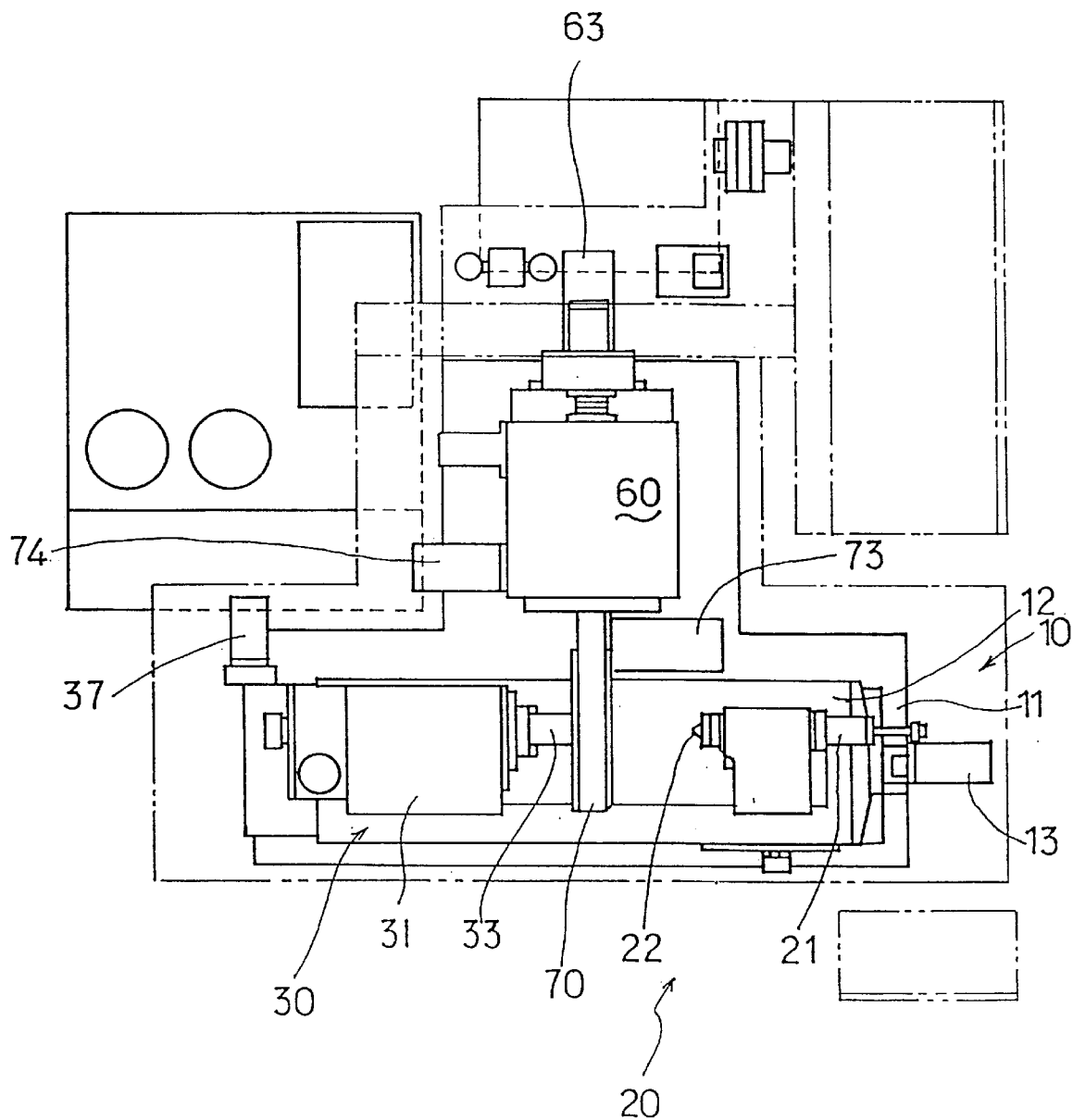
FIG. 2 is a plan view of the gear finishing apparatus show in FIG. 1.
Figure 3:
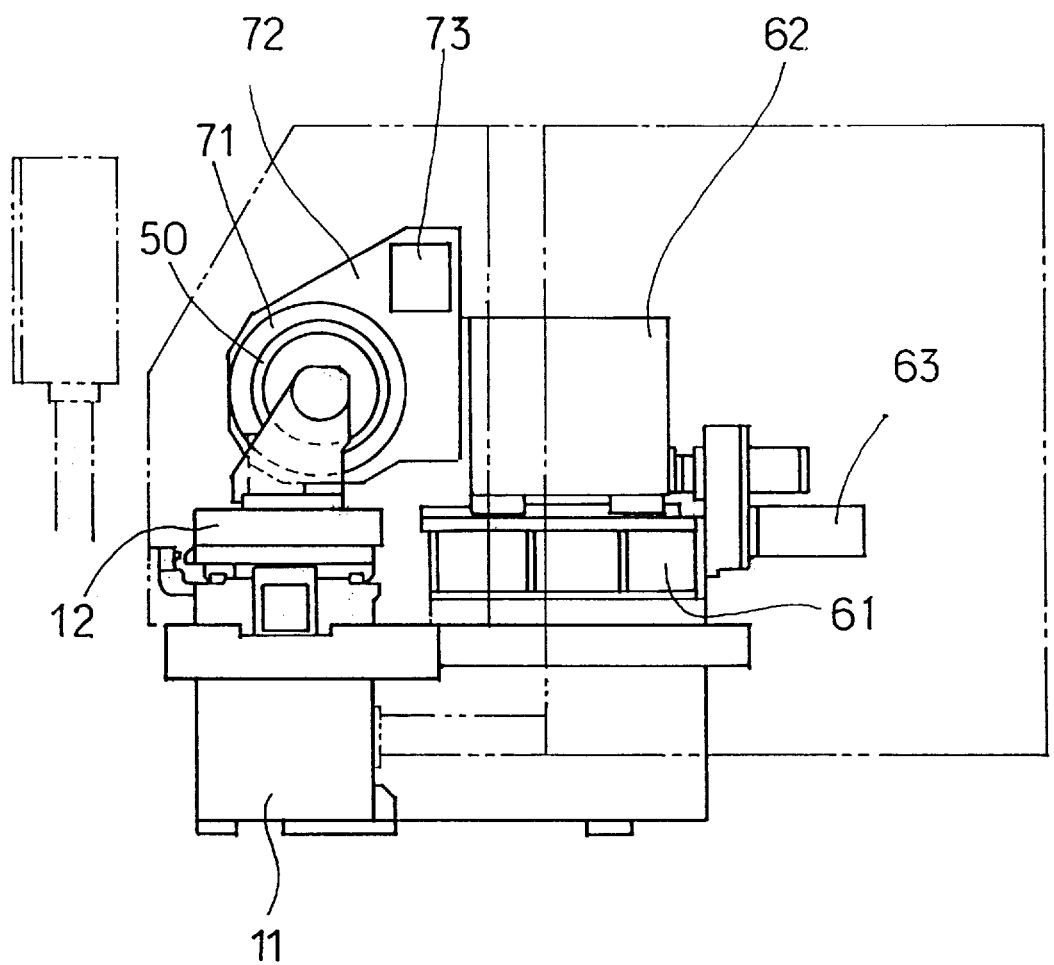
FIG. 3 is a side view of the gear finishing apparatus of FIG. 1.

The embodiment of the present invention will now be described below with reference to the accompanying drawings. FIGS. 1 and 2 are a front elevation and a plan view of a gear finishing apparatus (out of operation) according to one embodiment of the present invention, respectively. This gear finishing apparatus comprises a bed-shaped base 11 and a table 12 slidably supported on the base 11. The table 12 is moved in right and left hand directions in FIGS. 1 and 2 by a feed motor 13. Mounted on the table 12 are a tail stock 20 and a gear holder 30 for holding a workpiece gear. The tail stock 20 is of the typical type that comprises, at its fore end, a jig 22 for holding a workpiece gear, and a cylinder 21, at its rear end, for advancing the jig to hold the workpiece gear.

A gear holder 30 comprises a main body 31 disposed on the table 12. This gear holder will be later described.

Arranged on the rear of the base 10 is a slider 60. This slider 60 holds a finishing wheel 50 above the table 12 and moves the finishing wheel perpendicularly to the axis of the tail stock to perform a cutting operation using the finishing wheel. The slider 60, for this purpose, comprises a slider body 62 disposed on a stationary base 61, the slider body 62 being driven by a slider motor 63 provided on the base 61 and a feed screw mechanism.

Figure 4:
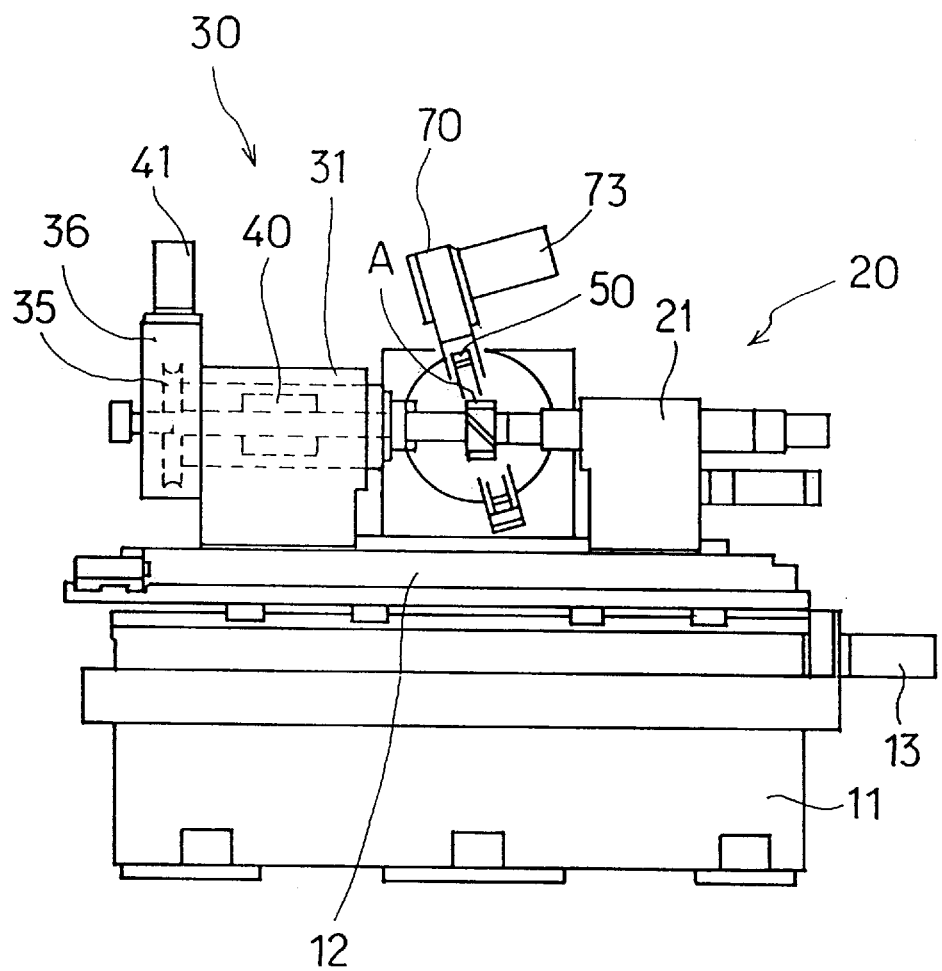
FIG. 4 is a front elevation of the gear finishing apparatus of FIG. 1 in operation.

Provided on the fore end of the slider body 62 is a finishing wheel holder 70. The finishing wheel holder comprises an annular head 71 above the table 12. A wheel holder body 72 holds the head 71 rotatably about the gear axis, and connects the head 71 to the slider body 62 of the slider. The head 71 is provided with external teeth and rotated by a finishing wheel drive motor 73 and a gear in mesh with the motor 73, the motor 73 being supported by the wheel holder body. On the inner circumferential surface of the head 71, a finishing wheel is securely mounted by attaching wheel retainer rings on either side of the finishing wheel. The wheel holder body 72 is mounted on the slider body 62 rotatably about the horizontal axis extending perpendicular to the gear axis, and is rotated about the horizontal axis by a gear mounted on a rotational shaft of the wheel holder body, a gear mounted on the slider body and a head turning motor 74 to thereby hold the finishing wheel at a desired crossed axes angle relative to the workpiece gear. FIG. 4 shows that a finishing wheel 50 is held at a desired crossed axes angle by the finishing wheel holder.

Figure 5:
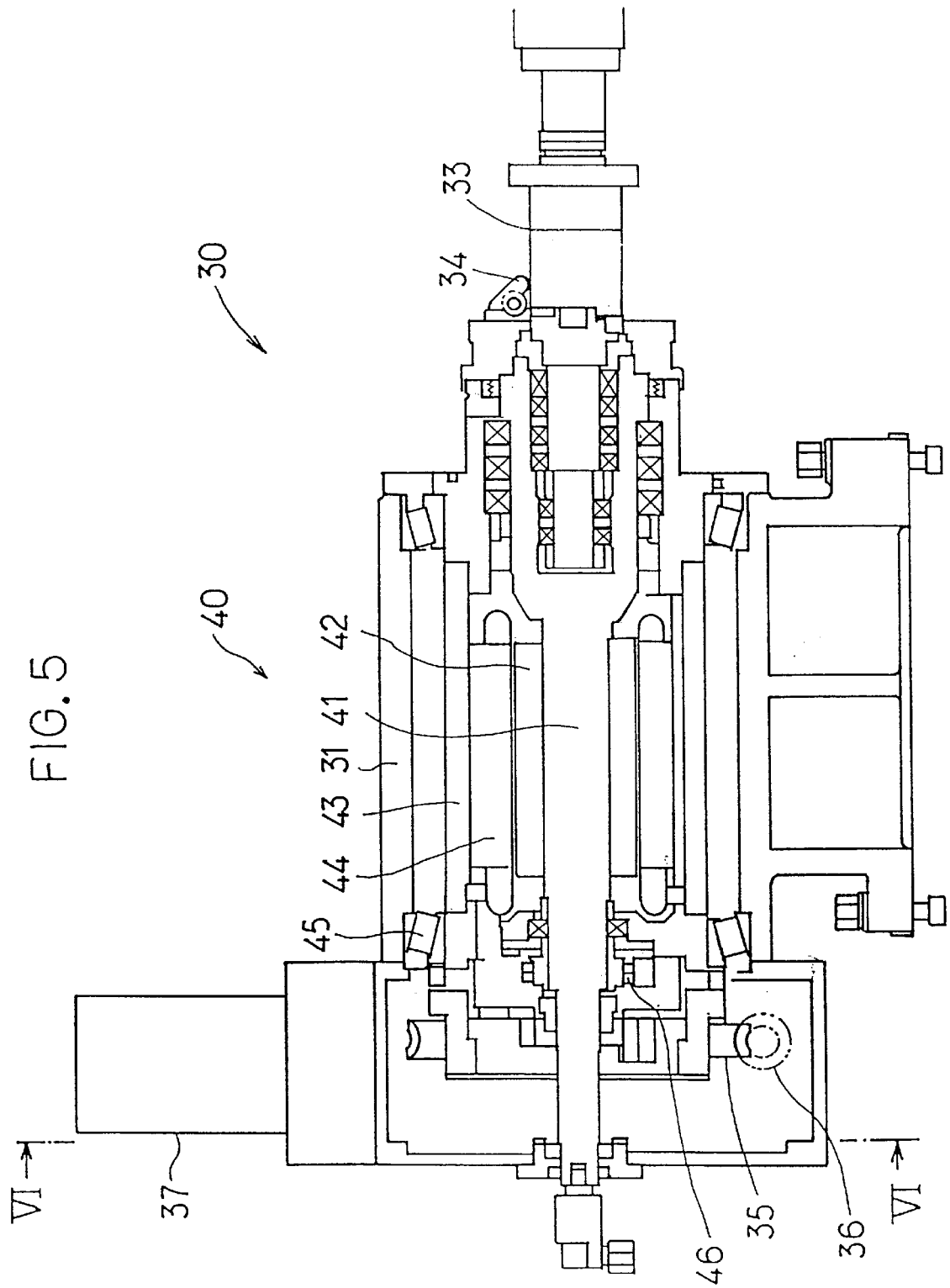
FIG. 5 is a vertical cross section showing the details of a gear holder of the finishing gear apparatus of FIG. 1.
Figure 6:
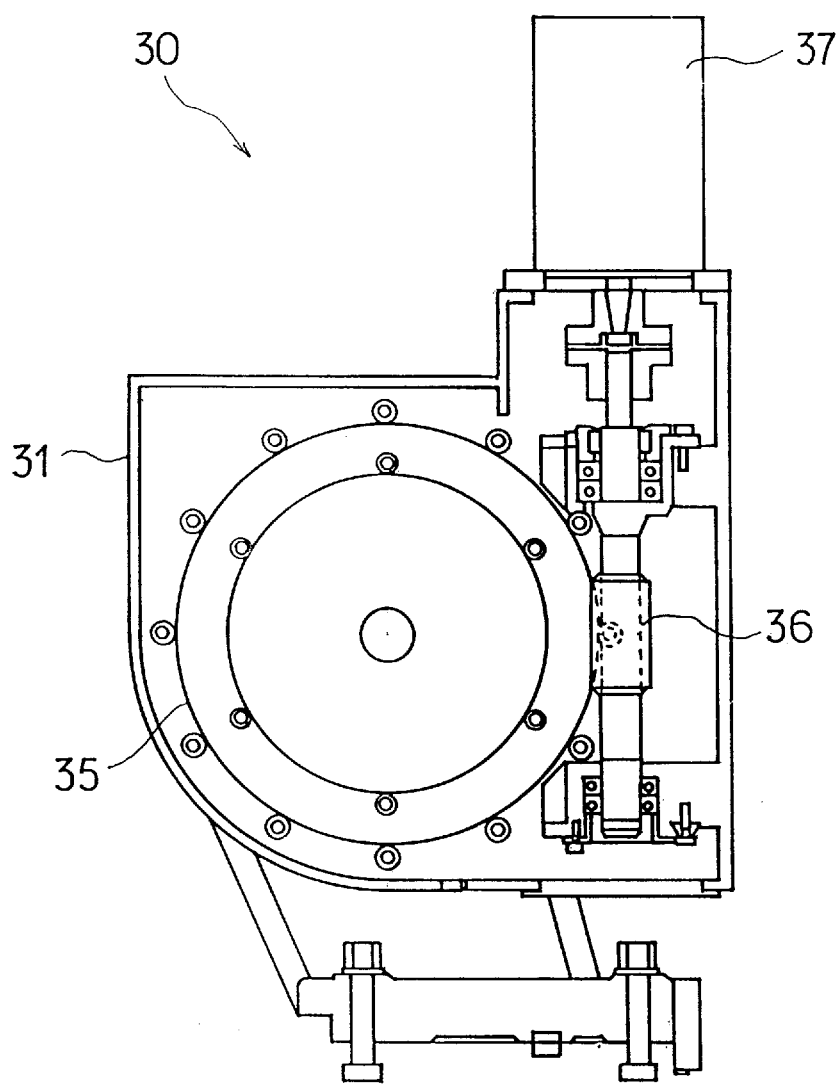
FIG. 6 is a cross section taken along Line VI—VI of FIG. 5.

FIGS. 5 and 6 show the details of a gear holder. The gear holder 30 comprises a main body 31 disposed on the table 12 and a motor 40 accommodated in the main body.

The motor 40 comprises a spindle 41 at a location aligning with the axis of the tail stock, the spindle 41 being supported at its opposite ends by the main body 31. Mounted on the central portion of the spindle 41 is a coil, i.e., an armature 42. Further, in the main body 31, a motor drum 43 is rotatably supported to surround the armature 42. Within the motor drum, a stator 44 is mounted to face the armature 42. The reference numeral 45 of FIG. 5 denotes a roller bearing for rotatably supporting the motor drum 43.

The fore end portion of the spindle 41 is of hollow cylindrical shape having an increased diameter and rotatably holds the rear end of a holder shaft 33 inside. Rotatably attached at the foremost end portion of the spindle 41 are three clutch pawls 34 that can take a position for tightly contacting the holder shaft and a position out of the contact, based on hydraulic power transmitted via an internal passageway through the spindle. A worm gear 35 is secured on the rear end portion of the motor drum 43. The main body 31 is provided with a worm 36 in mesh with the worm gear. The shaft of the worm is connected to a helix compensation motor 37 mounted on the main body 31. Provided on the rear portion of the spindle 41 is an encoder 46 for measuring the rotational rate of the spindle. The output therefrom is sent to a controller.

The fore end of the holder shaft 33 receives one end of a work arbor on which the helical gear is mounted, and the cylinder 21 of the tail stock 20 is pressed against the other end of the work arbor to hold the helical gear at a working position.

The finishing gear apparatus operates as follows. Firstly, a finishing wheel 50 is attached to the head 71, which is then inclined at a predetermined crossed axes angle by the slider 60 and locked to mesh with a workpiece gear with a backlash. The helical gear A to be finished is mounted on the gear holder 30 via a work arbor. Then, the jig 22 is advanced by the cylinder 21 of the tail stock 20 to hold the helical gear. At this time, the clutch pawls 34 are in a position out of contact with the holder shaft. In this state, a finishing wheel drive motor 73 and a gear drive motor 40 of the workpiece gear holder 30 are rotated. When it is detected via an encoder of the wheel drive motor 73 and the encoder 46 of the spindle detect that both motors have reached a predetermined rotational ratio, the clutch pawl is rotated by hydraulic power to tightly contact holder shaft 33. Thereby, the finishing wheel and the helical gear are both driven and rotated at the same circumferential speed. In this state, the feed motor 13 is actuated to reciprocally move the table 12 together with the helical gear in the axial direction of the gear relative to the finishing wheel holder 70. In association with this reciprocal movement, the helix compensation motor is actuated to rotate the motor drum 43 via the worm 36 and the worm gear 35. The rotation of the motor drum 43 is transmitted to the holder shaft 33 via the spindle 41. A controller of the helix compensation motor 37 is programed, beforehand, to be controlled in respect of the rotational speed and the amount of rotation in relation to the rotational rates of the feed motor 13 and the wheel drive motor 73 and helix angle of the helical gear. In other words, as the helical gear and the finishing wheel moves relatively to each other along the direction of the gear axis, the rotational rates thereof are adjusted such that the tooth of the finishing wheel moves along the tooth surface of the helical gear. After the completion of the finishing process, a reverse operation to the afore-mentioned process is conducted. The helical gear is lastly taken out from the gear holder 30.

In the above embodiment, an internally toothed finishing wheel was used, but it is also possible to use an externally toothed finishing wheel. In this case, the above-mentioned basic structure is employed, for example, the finishing wheel can be rotated in mesh with the workpiece gear at a predetermined crossed axes angle. Further, the finishing wheel is rotated by a wheel drive motor via a transmission mechanism made up of gears that rotates with the finishing wheel.

[ADVANTAGES OF THE INVENTION]

As described above, according to the present invention, the holder shaft of the gear holder is driven and rotated by a motor built in the holder body of the gear holder, in addition to a drive unit for rotating the finishing wheel. Further, the gear holder comprises a rotational drive unit for rotating a motor drum of a motor built therein, so that the built-in motor can be rotated with the gear holder shaft. Therefore, when the workpiece gear is reciprocally moved along the gear axis in a finishing process, the holder shaft can be rotated by the motor in relation to the reciprocal movement. Thereby, even if the tooth surface of the finishing wheel is inclined relative to the direction of reciprocal movement of the workpiece gear, it is possible to reciprocally move the teeth of the helical gear along the tooth surface of the finishing wheel while rotating the helical gear. As a result, it is possible to perform a high-accurate finishing process by driving both the finishing wheel and the helical gear.

We claim:

1. A gear finishing apparatus for finishing a helical gear by rotating a gear-type finishing wheel to thereby rotate the helical gear about its gear axis in mesh with the finishing wheel, the apparatus comprising:

a base;

a table supported on the base;

a gear holder supported on the table to hold the helical gear and rotate the helical gear about its gear axis;

a tail stock supported by the table on the opposite side of the helical gear to the gear holder to hold the helical gear;

a slider supported on the base so as to move toward and away from the helical gear in a substantially perpendicular direction to the gear axis of the helical gear;

a finishing wheel holder supported by the slider and holding the finishing wheel at a crossed axes angle relative to the helical gear and rotatably about the central axis of the helical gear;

a finishing wheel drive unit for rotating the finishing wheel on the finishing wheel holder; and a feeder for moving at least one of the table and the slider for relative movement between them in the direction along the gear axis, wherein the gear holder comprises:

a holder body supported on the table;

a holder shaft mounted on the holder body rotatably about the gear axis to hold the helical gear;

a drive motor for rotating the holder shaft;

a motor drum for holding the motor rotatably about the gear axis relative to the holder body; and a compensation drive unit for rotating the drum.

2. A gear finishing apparatus according to claim 1, wherein the drive motor of the gear holder rotates the helical gear at the same circumferential speed as the finishing wheel rotation caused by the finishing wheel drive unit.

3. A gear finishing apparatus according to claim 1, wherein the compensation drive unit moves forwards and backward the rotational phase of the motor drum to accommodate the rotational phase to a helix angle of the helical gear during the relative reciprocal movement of the table and the slider caused by the feeder so that the reciprocal movement is carried out along with the tooth surface of the helical gear during rotation of the finishing wheel drive unit and the gear drive motor.

* * * * *